US010110467B2

(12) United States Patent
Thyni et al.

(10) Patent No.: US 10,110,467 B2
(45) Date of Patent: Oct. 23, 2018

(54) ROUTING PATH SELECTION BASED ON DYNAMICAL METRIC VALUES

(71) Applicant: Telefonaktiebolaget LM Ericsson (publ), Stockholm (SE)

(72) Inventors: Tomas Thyni, Järfälla (SE); Lars Hallström, Vaxholm (SE); Johan Kölhi, Vaxholm (SE); Annikki Welin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/123,163

(22) PCT Filed: Mar. 6, 2014

(86) PCT No.: PCT/SE2014/050275
§ 371 (c)(1),
(2) Date: Sep. 1, 2016

(87) PCT Pub. No.: WO2015/133950
PCT Pub. Date: Sep. 11, 2015

(65) Prior Publication Data
US 2017/0078186 A1 Mar. 16, 2017

(51) Int. Cl.
*H04L 12/721* (2013.01)
*H04L 12/707* (2013.01)
(Continued)

(52) U.S. Cl.
CPC ............ *H04L 45/124* (2013.01); *H04L 45/02* (2013.01); *H04L 45/24* (2013.01); *H04L 47/125* (2013.01)

(58) Field of Classification Search
CPC ....... H04L 45/124; H04L 45/24; H04L 45/02; H04L 47/125
See application file for complete search history.

(56) References Cited

U.S. PATENT DOCUMENTS

| | | | |
|---|---|---|---|
| 6,084,858 A * | 7/2000 | Matthews | ............. H04L 45/124 370/238 |
| 2002/0083195 A1* | 6/2002 | Beshai | ................ H04L 12/5692 709/238 |

(Continued)

FOREIGN PATENT DOCUMENTS

WO    WO 2006/121683 A2    11/2006

OTHER PUBLICATIONS

International Search Report and Written Opinion of the International Searching Authority, Application No. PCT/SE2014/050275, dated Dec. 8, 2014.

(Continued)

*Primary Examiner* — Asad Nawaz
*Assistant Examiner* — Saad A Waqas
(74) *Attorney, Agent, or Firm* — Sage Patent Group

(57) ABSTRACT

A source network node performs routing path selection in a communications network by steps that include acquiring a dynamically changing metric value of at least one of a plurality of data routing paths extending from the source network node to a destination network node to which data is to be routed. A determination is made as to which of the data routing paths the data is to be routed on the basis of the acquired dynamically changing metric value of the at least one data routing path in order to satisfy at least one predetermined routing criterion. Routing of the data from the source network node to the destination node is then controlled to be performed over the determined data routing paths.

15 Claims, 5 Drawing Sheets

(51) Int. Cl.
*H04L 12/803* (2013.01)
*H04L 12/751* (2013.01)

(56) References Cited

U.S. PATENT DOCUMENTS

| | | |
|---|---|---|
| 2005/0066052 A1 | 3/2005 | Gupta et al. |
| 2006/0140111 A1* | 6/2006 | Vasseur .................. H04L 45/02 370/216 |
| 2010/0246480 A1* | 9/2010 | Aggarwal ............. H04L 45/123 370/328 |
| 2015/0382275 A1* | 12/2015 | Pragada ................ H04W 40/12 370/236 |

OTHER PUBLICATIONS

Huitema, "Why Is OSPF So Complex?" from *Routing in the Internet*, Englewood Cliffs, N.J: Prentice Hall PTR, XP002733041, 1995, pp. 99-134.

* cited by examiner

ROUTING PATH SELECTION BASED ON DYNAMICAL METRIC VALUES

CROSS REFERENCE TO RELATED APPLICATION

This application is a 35 U.S.C. § 371 national stage application of PCT International Application No. PCT/SE2014/050275, filed on Mar. 6, 2014, the disclosure and content of which is incorporated by reference herein in its entirety. The above-referenced PCT International Application was published in the English language as International Publication No. WO 2015/133950 A1 on Sep. 11, 2015.

TECHNICAL FIELD

The invention relates to a network node and method at a source network node of performing routing path selection in a communications network. The invention further relates to a computer program performing the method according to the present invention, and a computer program product comprising computer readable medium having the computer program embodied therein.

BACKGROUND

In a communications network, data can normally be routed via one or more of a plurality of routing paths. In order to balance data load among the different routing paths on the network, load balancing is performed. Load balancing can be undertaken in many different manners; for instance, data may be transferred from a source routing node in the network to a destination node using a shortest path commonly calculated using the so called Dijkstra's algorithm, or data may be transmitted to travel on various (non-shortest) routing paths to better balance to network load, even though the selected paths are non-optimal with respect to e.g. Quality of Service (QoS). Metrics of each routing path form the basis for calculating which routing paths should be used for transferring the data from the source node to the destination node. Load balancing generally aims at optimizing the use of resources in the network based on one or more metrics. For instance, the objective may be to maximize throughput, minimize response time, provide the best possible QoS for a particular transmitted piece of data. In a general example, to load balance the network, the routing paths passing through routing nodes having the greatest available capacity is selected, thereby assigning a greater load to high-capacity routers.

A problem in the art when performing routing path selection, e.g. for the purpose of performing load balancing, is that the routing path selection relies on a static model of the network which oftentimes results in inaccurate metrics, thus using inexact metric values as a basis for calculating and selecting the routing paths on which the data is to be submitted, which ultimately leads to an inferior routing path selection approach.

SUMMARY

An object of the present invention is to solve, or at least mitigate, this problem in the art and to provide and improved method and device of performing load balancing in a communications network.

This object is attained in a first aspect of the present invention by a method at a source network node of performing routing path selection in a communications network. The method comprises acquiring a dynamically changing metric value of at least one of a plurality of data routing paths extending from the source network node to a destination network node to which data is to be routed. Further, the method comprises determining via which of the data routing paths the data is to be routed on the basis of the acquired dynamically changing metric value of the at least one data routing path in order to satisfy at least one predetermined routing criterion, and routing the data from the source network node to the destination node over the determined data routing paths.

This object is attained in a second aspect of the present invention by a network node performing routing path selection in a communications network. The network node comprises a processor and a memory, which memory contains instructions executable by the processor, whereby the network node is operative to acquire a dynamically changing metric value of at least one of a plurality of data routing paths extending to a destination network node to which data is to be routed; The network node is further operative to determine via which of the data routing paths the data is to be routed on the basis of the acquired dynamically changing metric value of the at least one data routing path in order to satisfy at least one predetermined routing criterion, and to route the data to the destination node over the determined data routing paths.

Advantageously, in contrast to prior art approaches for selecting data routing paths where static metric values are used, the present invention acquires—for example by measurement and/or estimation—dynamically changing metric values of one or more routing paths to determine via which routing paths data should be transferred to a destination node. By using actual, dynamic metric values, effective network load is accounted for, and when determining whether a predetermined routing criterion is satisfied based on the acquired dynamically changing metric values such that the selection can be performed, the chances that an adequate routing path selection is made will advantageously increase.

For instance, in the art, when determining which routing paths to select for transmitting the data from a source router via a number of intermediate routers to a destination node in a network on the basis of a metric such as e.g. bandwidth, each router has access to and acquires its respective port data for determining the bandwidth of the routing paths emanating from the router. However, this data corresponds to static bandwidth values reflecting the best case bandwidth of the routing paths. Hence, the static value used when selecting routing paths could for instance amount to 1 Gbps (bits per second), while the actual effective bandwidth may be 500 Mbps due to network load. This is advantageously overcome by embodiments of the present invention in that the actual dynamic bandwidth value of one or more routing paths is acquired and taken into account in order to determine via which routing paths data should be transmitted to the destination node.

Further provided are computer programs performing the methods according to the present invention, and computer program products comprising computer readable medium having the computer programs embodied therein.

In embodiments of the present invention, dynamically changing metric values are acquired for a number of routing paths and the determination of via which of the data routing paths the data is to be routed is performed on the basis of a combination the dynamically changing metric values for the data routing paths. Advantageously, even though it may suffice to acquire a dynamically changing metric value of a single routing path to improve the routing path selection, still further improvements can be achieved by e.g. acquiring a dynamically changing bandwidth value of each potential routing path to be selected. By basing the routing path selection of acquired dynamic metric values of each routing path, a routing path selection reflecting actual network load is advantageously obtained.

In further embodiments of the present invention two or more different metrics are considered for the routing paths dynamic. A number of different metrics can be considered when performing routing path selection, such as bandwidth, delay, buffering capacity at network nodes arranged in the data routing paths, degree of packet loss, noise level, etc. The above given example regarding using bandwidth as metric can be complemented with using a further metric such as e.g. packet loss for the respective routing path. Advantageously, this will even better reflect the actual network situation.

In yet a further embodiment, the acquired dynamically changing metric values are advantageously set to be valid for a predetermined period, after which new dynamically changing metric values are acquired and used for determining via which data routing path the data is to be routed. Since the dynamics of the network may fluctuate relatively fast, it is necessary to keep the dynamically changing metric values up to date, meaning that the dynamic metric values are measured/estimated frequently with a time period set depending on the situation.

Further embodiments of the present invention will be illustrated and discussed in the detailed description herein below.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
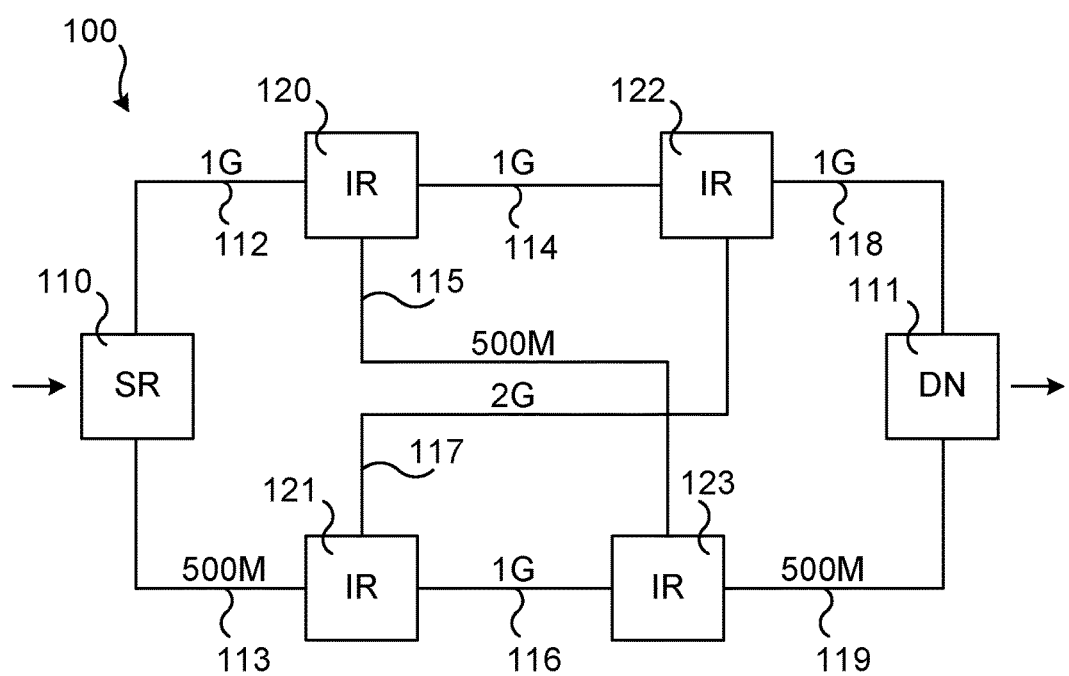
FIG. 1 illustrates an exemplifying communications network in which the present invention may be applied.

FIG. 1 illustrates an exemplifying communications network 100 in which the present invention may be applied. A source router (SR) 110 routes a set of data to a destination node (DN) 111, via any combination of data routing paths 112-119 and intermediate routers (IR) 120-123. For illustrational purposes, the network 100 is small and in practice, selection of many more routing paths may have to performed in order to route data from a source node to a destination node.

Now, in the art, when determining which routing paths to select for transmitting the data from the source router 110 to the destination node 111 on the basis of one or more metric(s), in this particular prior art exemplified in the form of routing path bandwidth, each router has access to and acquires port data. Hence, a first intermediate router 120 has access to a maximum of 1 Gbps when transmitting data on a third routing path 114, but only to a maximum of 500 Mbps when using one of its ports to transmit data via a fourth routing path 115. These static metric values are subsequently used to determine which routing paths to use to route data from the source node 110 to the destination node 111. FIG. 1 shows the maximum bandwidth available at each data routing path 112-119.

In a simple prior art example, these static metric values are used for calculating which routing paths to use, where for example the routing paths providing a highest aggregated bandwidth, or correspondingly a lowest cost, are used for routing data from the source router no to the destination node in (while maintaining a same number of hops from the source to the destination for each different calculation). Typically, the metric values are indexed based on a reference metric value, in this example 1 Gbps. The cost is then calculated for each set of routing paths as:

$$(1/1+1/1+1/1)=3 \text{ for paths } 112,114,118;$$

$$(1/1+1/0.5+1/0.5)=4.5 \text{ for paths } 112,115,119;$$

$$(1/0.5+1/2+1/1)=3.5 \text{ for paths } 113,117,118; \text{ and}$$

$$(1/0.5+1/1+1/0.5)=5 \text{ for paths } 113,116,119.$$

In this particular prior art example, routing paths 112, 114 and 118 via intermediate routers 120 and 122 would be chosen since they result in the lowest cost.

With an embodiment of the present invention, instead of relying on static metric values, which may be misleading due to being mismatched to actual, dynamically changing metric values since they do not reflect real-time network load, a dynamically changing metric value of at least one data routing path is acquired by the source router 110. This may be undertaken by actually measuring a metric value at one or more intermediate routers 120-123 and reporting to the source node 110, or alternatively by estimating the metric value in order to attain the actual, dynamically changing metric value. Even though the dynamic metric value of a single routing path may be enough to improve the routing path selection process, it is typically even more advantageous to acquire dynamic metric values of a plurality of routing paths based on a combination of the acquired dynamic metric values as will be discussed in detail in the following.

However, a scenario can be envisaged where one or a couple of routing paths are bottlenecks for providing e.g. good data throughput. In such a case, it may be sufficient to measure or estimate a dynamic metric value of this single routing path and determine if this particular routing path should be selected for transferring the data from the source router 110 to the destination node 111 or not. Thus, the dynamic metric value (being e.g. bandwidth) of this particular routing path is compared to a predetermined routing criterion in the form of a bandwidth threshold value, and if the acquired metric value exceeds the bandwidth threshold value, this routing path will be selected for transfer of the data. Hence, if the fluctuations in the acquired dynamic metric value are substantially greater for one or a few routing paths as compared to the other network routing paths via which the data potentially is to be transmitted to the destination node 111, it may be sufficient to only evaluate these few paths.

With reference to FIG. 1, assuming for instance that the dynamically changing bandwidth value of the routing path 112 in practice rarely is 1 Gbps, but rather around 500 Mbps, an embodiment according to the present invention would calculate the available bandwidth of the prior "best" routing paths 112, 114, 116 in the form of a cost measure as (1/0.5+1/1+1/1)=4, and instead select routing paths 113, 117 and 118 for routing the data, thus again resulting in a cost (i.e. a measure of available bandwidth) of (1/0.5+1/2+0) =3.5. Hence, routing paths 113, 117, 118 effectively have the highest available bandwidth, i.e. the lowest calculated cost, when taking into account actual network conditions. Advantageously, the present invention can greatly improve the selection of routing paths to use as compared to the prior art static approach.

It should be noted that a set of routing paths resulting in the lowest cost from the source node 110 to the destination node 111 not necessarily is selected for routing the data, since the predetermined routing criterion may stipulate a different selection. Assuming for example that the routing paths 112, 114, 118 would have an actual available bandwidth of 500 Mbps, 1 Gbps and 1 Gbps, respectively, resulting in a cost of (1/0.5+i/i+0)=4, while routing paths 113, 117, 118 would have an actual bandwidth of 600 Mbps, 600 Mbps and 1 Gbps, respectively, resulting in a cost of (1/0.6+1/0.6+0)=4.3, it may still be preferable to select the higher-cost routing path set formed by paths 113, 117, 118, since the "bottleneck" bandwidth would be 600 Mbps (instead of 500 Mbps).

In an embodiment, the above described summation-type cost calculation approach is not used, but instead it is determined that routing path 112 having 500 Mbps and routing path 113 having 600 Mbps are the limiting paths and thus only these two paths are considered. Hence, in case highest available bandwidth is the routing criterion to be satisfied, the routing path 113 is selected over the routing path 112 for data transport to the destination node 111 (further including transport over paths 117 and 118). Since in this embodiment the two bottlenecks are taken into account for determining highest available bandwidth, the remaining routing paths may not necessarily be considered when calculating the cost; only the dynamic metric value of a single routing path (500 Mbps versus 600 Mbps) is used for calculating cost for the respective routing path set 112, 114, 118 and 113, 117, 118.

It is to be understood that various different approaches are possible for calculating cost, or any other appropriate measure, in order to determine on which routing paths to transport data from the source node 110 to the destination node 111. Further, as can be seen, the selected approach may also depend on the particular routing criteria to be satisfied for selecting the routing paths.

In further embodiments, there can be a different path selection for certain types of traffic where bandwidth is not considered important, but where for instance latency is. Assuming for example that the routing paths 112, 114, 118 would have an actual latency of 3 ms, 1 ms and 1 ms, respectively, resulting in a latency cost of (3+1+1)=5 ms, while routing paths 113, 117, 118 would have an actual latency of 3 ms, 2 ms and 1 ms, respectively, resulting in a cost of (3+2+1)=6 ms, and therefore paths 112, 114, 118 is preferred from a latency point of view.

In yet further embodiments, a first subset of the data is transported over a first selected set of routing paths satisfying a first predetermined criterion, while a second subset of the data is transported over a second selected set of routing paths satisfying a second predetermined criterion. For instance, the first subset of data may be sensitive to bandwidth, whereas the second subset of data is sensitive to delay, and different routes are determined based on these different criteria.

By using these two path selection mechanisms at the same time, different types of traffic can advantageously be load balanced across different routing paths in the network at the same time. The selection can be done looking at Class of Service (CoS) values in data packets, and load balancing across multiple paths can be achieved by combining traditional 5-tuple hashing with CoS values.

In still further embodiments, a first subset of the data belonging to a first CoS is transported over a first selected set of routing paths satisfying the predetermined criterion, while a second subset of the data belonging to a second CoS is transported over a second selected set of routing paths.

Figure 2:
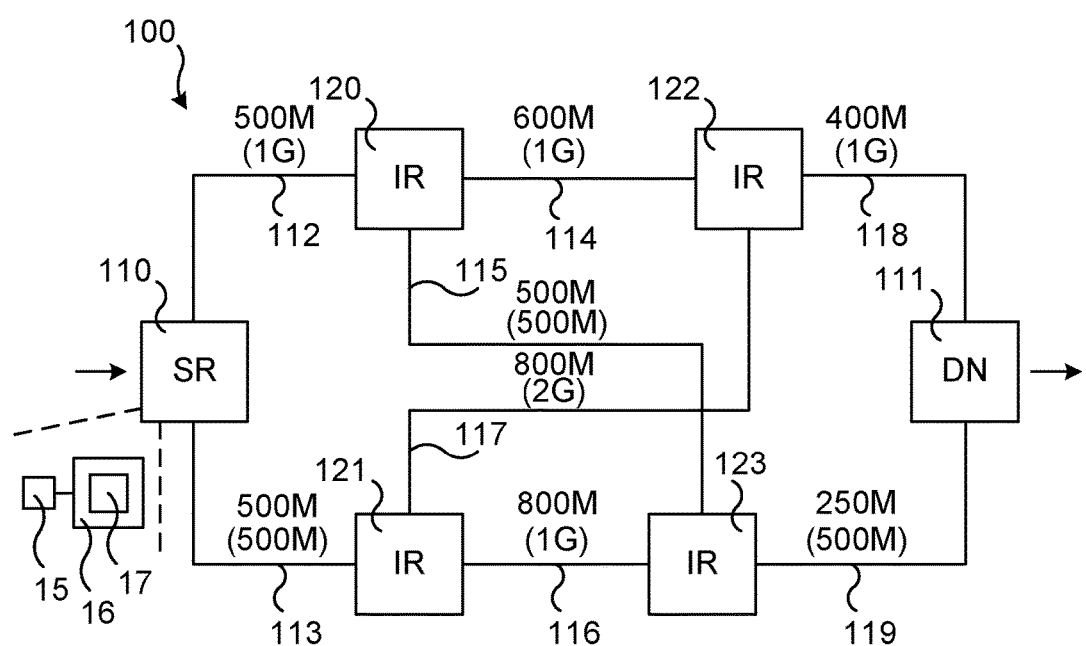
FIG. 2 illustrates an embodiment of a method of the present invention implemented in the network of FIG. 1.

FIG. 2 illustrates an embodiment of a method of the present invention implemented in the network 100 of FIG. 1, but where a dynamically changing metric value of the respective data routing path 112-119 extending from the source network node 110 to the destination network node 111 to which data is to be routed has been acquired. The maximum bandwidth value of the respective routing path used in the prior art example discussed with reference to FIG. 1 is given in brackets.

In this exemplifying embodiment, the previous best routing path selection of FIG. 1 now results in a cost/bandwidth measure of (1/0.5+1/0.6+1/0.4)=6.2, while an actual highest available bandwidth is provided by routing paths 113, 117 and 118, i.e. (1/0.5+1/0.8+1/0.4)=5.8. The cost of each set of routing paths in FIG. 2 can be summarized as:

(1/0.5+1/0.6+1/0.4)=6.2 for paths 112,114,118;

(1/0.5+1/0.5+1/0.25)=8 for paths 112,115,119;

(1/0.5+1/0.8+1/0.4)=5.8 for paths 113,117,118; and (1/0.5+1/0.8+1/0.25)=7.3 for paths 113,116,119.

In line with a previously described embodiment, only the cost for a single routing path in each set of routing paths could be considered, in which case the cost of each set of routing paths in FIG. 2 can be summarized as:

1/0.4=2.5 for paths 112,114,118;

1/0.25=4 for paths 112,115,119;

1/0.4=2.5 for paths 113,117,118; and

1/0.25=4 for paths 113,116,119.

Thus, the sets of routing paths formed by paths 112, 114, 117 and paths 113, 117, 118, respectively has the same cost/highest available bandwidth, meaning that any one of these two the routing path sets could be selected for transport of the data from the source router no to the destination node 111.

Alternatively, the data can advantageously be load balanced over these two routing paths sets in that a first subset of the data is routed over the first routing path set 112, 114, 117, while a second subset of the data is routed over the second routing path set 113, 117, 118.

It should be noted that this bandwidth/cost measure is used as an example only for illustrating whether the predetermined routing criterion is satisfied. In practice, more complex algorithms are typically employed, such as the previously mentioned Dijkstra algorithm. A variety of known algorithms—and routing criteria—could be envisaged for enabling routing path selection based on dynamically changing metric values in accordance with embodiments of the present invention.

A network node according to embodiments of the present invention, illustrated in FIG. 2 by source routing node 110, typically comprises a processing unit 15 embodied in the form of one or more microprocessors arranged to execute a computer program 17 for performing the method according to embodiments of the present invention. The computer program 17 is downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processor 15. The storage medium 16 may also be a computer program product comprising the computer program 17. Alternatively, the computer program 17 may be transferred to the storage medium 16 by means of a suitable computer program product, such as a Digital Versatile disc (DVD) or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), a digital signal processor (DSP), etc.

Figure 3:
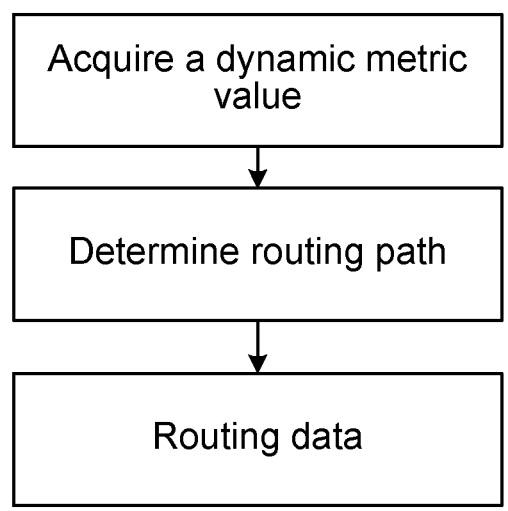
FIG. 3 illustrates a flowchart of an embodiment of a method of the present invention.

FIG. 3 illustrates a flowchart of an embodiment of a method of the present invention. Reference is further made to the network 100 of FIG. 2. For simplicity, the same metric values will be used when determining a routing path in this flowchart. In a first step S101, the source routing node 110 acquires a dynamically changing metric—in this example bandwidth—value of each one of the plurality of data routing paths 112-119 extending from the source routing node 110 to the destination node 111 to which data is to be routed. This may be undertaken e.g. by having the source node 110 estimating the metric value of the respective routing path, or by having the intermediate routers 120-123 measure or estimate the bandwidth of their outgoing routing paths and report the measured/estimated values to the source node 110.

In a second step S102, the source node 110 (or possibly some other appropriate network supervision node) determines via which of the data routing paths 112-119 the data is to be routed on the basis of the acquired dynamically changing bandwidth values of the data routing paths in order to satisfy at least one predetermined routing criterion, the criterion being "highest available bandwidth" in this particular exemplifying embodiment in line with the previous examples. Given that the same number of hops is to be undertaken for the data travelling from the source node 110 to the destination node 111, there are four potential routes: paths 112-114-118; paths 112-115-119; paths 113-117-117; or paths 113-116-119. As in the previous example discussed with reference to FIG. 2, data routing path 113-117-118 will result in a highest available bandwidth measure. Thus, in final step S103, the source node 110 routes the data to the destination node 111 over the determined data routing paths 113, 117, 118.

Its should be noted that acquired dynamic metric values for one or more routing paths can be combined with static metric values for others; for instance a mix of measured values, estimated values and acquired static values may be used.

The embodiment of the present invention described with reference to FIG. 2 suggests that the "best" routing path is selected in accordance with the predetermined routing criterion. However, that is not necessarily the case. In a further embodiment, the objective of the routing path selection may be e.g. to attain network load balancing. In such an embodiment, the predetermined routing criterion may be to choose routing paths from the source routing node 110 to the destination node 111 where a non-maximal bandwidth measure is used. It would even be possible to choose routing paths having a smallest available bandwidth, since the network needs to be load balanced thereby transporting data on lesser used routing paths; the predetermined routing criterion can take on many forms depending on objective to be achieved with the routing. Thus, in one embodiment, routing paths 112, 115 and 119 are evaluated and selected, resulting in a "lowest available bandwidth" criterion of (1/0.5+1/0.5+1/0.25)=8 being satisfied for routing the data. In a different scenario, part of the data may be submitted via the routing paths having the highest available bandwidth as discussed in the above, while the remaining part is sent over another selected set of data routing paths (such as the routing paths 112, 115, 119 providing the lowest available bandwidth). Again, it could be advantageous to evaluate the dynamic metric value of a single routing path in each set of routing paths, in which case path set 112, 115, 119 and path set 113, 116, 119 both will have a cost of 1/0.25=4 (which possibly could imply load balancing of data on these two routing path sets).

In this context, it can be envisaged that a set of data to be submitted, typically in the form of a plurality of packets, is assigned to a certain Class of Service (CoS) typically associated with a user to which the data packets pertain. The concept of CoS is typically used to differentiate one set of data from another with regards to e.g. QoS provided to the different data sets. For instance, a set of data packets associated with a first user may have a certain CoS while a set of data packets associated with a second user may have a different CoS, where the packets of the first individual are transported over higher-quality routing paths as compared to the data packets belonging to the second user. For instance, with reference again to FIG. 2, the data of the first user is transported via routing paths 113, 117 and 118 resulting in a cost of 50.8, while the data of the second user is transported via routing paths 112, 115 and 119 resulting in a cost of 8, in accordance with the CoS of the respective user. A third user associated with a CoS rated in between that of the first and the second user could be given access to transport via routing paths 112, 114 and 118, resulting in a cost of 6.2. Again, it could be advantageous to evaluate the dynamic metric value of a single routing path in each set of routing paths as previously has been described. Different variants can be envisaged; an emergency call may be assigned to have a CoS which always is given access to the best, highest-quality routing paths. Further, a user may belong to a CoS where some of the data transmitted always are transported on the best paths, while the remaining part will travel routing paths of a lesser quality.

As a result, in an embodiment of the present invention, a CoS criterion should be satisfied for the data to be routed in addition to the predetermined routing criterion. As has been described in the above, the available bandwidth of each set of routing paths from the source node 110 to the destination node 111 is calculated and compared to the "highest available bandwidth" criterion, and subsequently a part of data is sent via the best path, while the remaining part is sent on another path after having taking into account the CoS of the particular data.

In an embodiment of the present invention, the acquired dynamically changing metric values are valid for a predetermined period, after which new dynamically changing metric values are acquired and used for determining via which data routing path the data is to be routed. Since the dynamics of the network may fluctuate relatively fast, it is necessary to keep the dynamically changing metric values up to date, meaning that the dynamic metric values are measured/estimated frequently with a time period set depending on the particular situation. On the other hand, if a dynamic metric value is known to change slowly on a particular routing path, it may not be necessary to update the value with high recurrence. It is further possible that some metric values are valid for a first time period while other metric values are valid for another period. It can also be envisaged that different types of metrics are valid for different time periods.

Figure 4:
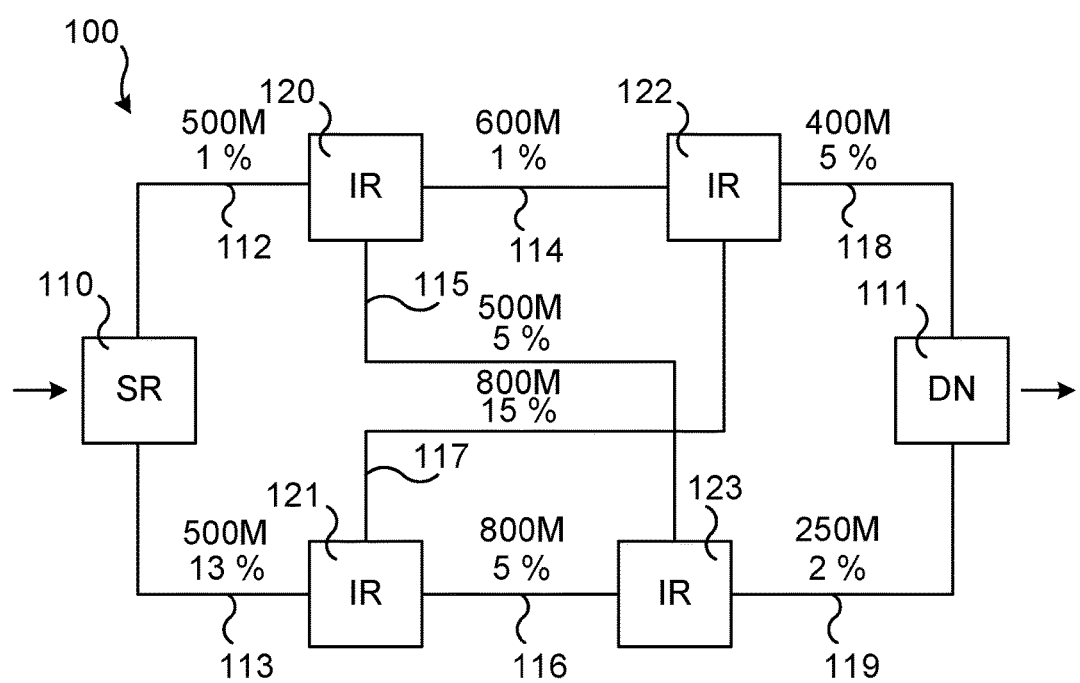
FIG. 4 illustrates another embodiment of a method of the present invention implemented in the network of FIG. 1.

FIG. 4 illustrates a further embodiment of the present invention where two different metrics of each routing path are acquired and used for determining via which routing paths data should be transferred from the source routing node 110 to the destination node 111. It should be noted that this is an exemplifying embodiment, and a single metric may still be used for some of the routing paths. In practice, a variety of metrics can be envisaged for determining routing path selection according to the present invention, such as bandwidth, delay, buffering capacity/size at the intermediate network nodes arranged in the data routing paths, degree of packet loss, noise level, etc. In the embodiment of FIG. 4, in addition to the dynamic bandwidth values previously indicated in FIG. 2, packet loss ratio is further considered, where e.g. routing path 112 is indicated to have a packet loss ratio of 20%, routing path 113 has a packet loss of 3%, etc. The routing criterion is again set to "greatest available bandwidth" but this time also taking into account packet loss. Thus, the routing paths 113, 117 and 118 having the highest effective available bandwidth measure in FIG. 2 now has a cost, when also taking into account packet loss, of $(1/0.5*0.87+1/0.8*0.85+1/0.4*0.95)=6.4$, while routing paths 112, 114 and 118 now has a cost of $(1/0.5*0.99+1/0.6*0.99+1/0.4*0.95)=6.3$, i.e. slightly lower when also considering the packet loss. Routing paths 112, 114 and 118 are thus selected for routing the data from the source routing node no to the destination node 111. The cost of each set of routing paths in FIG. 4 can be summarized as:

$(1/0.5*0.99+1/0.6*0.99+1/0.4*0.95)=6.3$ for paths 112,114,118;

$(1/0.5*0.99+1/0.5*0.95+1/0.25*0.98)=8.2$ for paths 112,115,119;

$(1/0.5*0.87+1/0.8*0.85+1/0.4*0.95)=6.4$ for paths 113,117,118; and $(1/0.5*0.87+1/0.8*0.95+1/0.25*0.98)=7.7$ for paths 113,116,119.

In line with a previously described embodiment, only the cost for a single routing path in each set of routing paths could be considered when combining packet loss and bandwidth in this particular example, in which case the cost of each set of routing paths in FIG. 4 can be summarized as:

$1/0.4*0.95=2.6$ for paths 112,114,118;

$1/0.25*0.98=4.1$ for paths 112,115,119;

$1/0.4*0.95=2.6$ for paths 113,117,118; and $1/0.25*0.98=4.1$ for paths 113,116,119.

Thus, the sets of routing paths formed by paths 112, 114, 117 and paths 113, 117, 118, respectively has the same cost/highest available bandwidth, meaning that any one of these two the routing path sets could be selected for transport of the data from the source router 110 to the destination node 111. Alternatively, the data can advantageously be load balanced over these two routing paths sets in that a first subset of the data is routed over the first routing path set 112, 114, 117, while a second subset of the data is routed over the second routing path set 113, 117, 118.

As in the previous embodiment discussed with reference to FIG. 1, where bandwidth and latency is considered for determining routing paths, it is possible to take the two metrics in account separate from each other rather than using a combination, in this case a product, of the two metrics.

Figure 5:
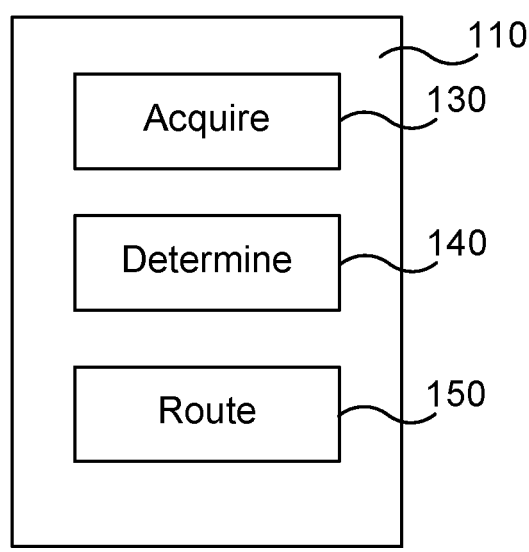
FIG. 5 illustrates an embodiment of a source routing node of the present invention.

FIG. 5 shows a source router no according to an embodiment of the present invention. The source router no comprises acquiring means 130 adapted to acquire a dynamically changing metric value of at least one of a plurality of data routing paths extending from the source router no to a destination network node to which data is to be routed. Further, the source router no comprises determining means 140 adapted to determine via which of the data routing paths the data is to be routed on the basis of the acquired dynamically changing metric value of the at least one data routing path in order to satisfy at least one predetermined routing criterion. Moreover, the source router no comprises routing means 150 adapted to route the data from the source network node to the destination node over the determined data routing paths. The acquiring means 130 and the routing means 150 may comprise a communications interface for receiving and providing information to other devices. The determining means 140 may further comprise a local storage for storing data. The acquiring means 130, determining means 140 and routing means 150 may (in analogy with the description given in connection to FIG. 2) be implemented by a processor embodied in the form of one or more microprocessors arranged to execute a computer program downloaded to a suitable storage medium associated with the microprocessor, such as a RAM, a Flash memory or a hard disk drive. The acquiring means 130 and routing means 140 may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method at a source network node of performing routing path selection in a communications network, comprising:
acquiring dynamically changing metric values of a plurality of data routing paths extending from the source network node to a destination network node to which data is to be routed, wherein each data routing path of the plurality of data routing paths comprise a plurality of hops and intermediate nodes;
determining a first acquired dynamically changing metric value of a first data routing path of the plurality of data routing paths satisfies a first predetermined routing criterion for routing a first data traffic type;
determining a second acquired dynamically changing metric value of a second data routing path of the plurality of data routing paths satisfies a second predetermined routing criterion for routing a second data traffic type, the second data routing path comprising at least one different intermediate node from intermediate nodes of the first data routing path;
routing a first subset of the data from the source network node to the destination node over the first data routing path, wherein the first subset of the data comprises the first data traffic type; and
routing a second subset of the data from the source network node to the destination node over the second data routing path, wherein the second subset of the data comprises the second data traffic type,
wherein the first predetermined routing criterion comprises a first Class of Service (CoS) criterion for the first data traffic type to be routed,
wherein the second predetermined routing criterion comprises a second CoS criterion for the second data traffic type to be routed.

2. The method according to claim 1, wherein the acquiring of the dynamically changing metric values of the plurality of data routing paths comprises:
measuring the dynamically changing metric value.

3. The method according to claim 1, wherein the acquiring of the dynamically changing metric values of the plurality of data routing paths comprises:
estimating the dynamically changing metric value.

4. The method according to claim 1, wherein the acquired dynamically changing metric values are valid for predetermined periods, after which new dynamically changing metric values are acquired.

5. The method according to claim 1, wherein the dynamically changing metric values are any one selected from a group comprising bandwidth, delay, buffering capacity at network nodes arranged in the data routing paths, degree of packet loss, and noise level.

6. The method according to claim 1, wherein the acquiring of the dynamically changing metric value of the plurality of data routing paths comprises:
acquiring a dynamically changing value for each of a number of different metrics for the plurality of data routing paths, wherein different metrics for the plurality of data routing paths are based on different metrics for the plurality of hops in the plurality of data routing paths.

7. The method according to claim 6, wherein the determining the first acquired dynamically changing metric value of the first data routing path is performed on the basis of a combination the dynamically changing values of the different metrics for the first data routing path; and
wherein the determining the second acquired dynamically changing metric value of the second data routing path is performed on the basis of a combination of the dynamically changing values of the different metrics for the second data routing path.

8. The method according to claim 1, further comprising:
acquiring a dynamically changing value of a single routing path of a first set of data routing paths from the source network node to the destination network node;
comparing an acquired dynamically changing metric value of a single routing path of a second set of data routing paths from the source network node to the destination network node, wherein the data is routed over the set of data routing paths associated with the one of the single routing paths of the first set and the second set of data routing paths having a dynamically changing metric value satisfying one of the first and second predetermined routing criterions.

9. The method of claim 1, wherein the dynamically changing metric values comprises a first set of dynamically changing metric values that are valid for a first time period and a second set of dynamically changing metric values that are valid for a second time period, the second time period being different that the first time period.

10. The method of claim 1, wherein the dynamically changing metric values reflect a real-time network load of intermediate nodes of the plurality of data routing paths.

11. A network node performing routing path selection in a communications network, the network node comprising a processor and a memory, said memory containing instructions executable by said processor to cause the network node to perform operations to:
acquire dynamically changing metric values of a plurality of data routing paths extending to a destination network node to which data is to be routed, wherein each data routing path of the plurality of data routing paths comprise a plurality of hops and intermediate nodes;
determine a first acquired dynamically changing metric value of a first data routing path of the plurality data routing paths satisfies a first predetermined routing criterion for routing a first data traffic type;
determine a second acquired dynamically changing metric value of a second data routing path of the plurality of data routing paths satisfies a second predetermined routing criterion for routing a second data traffic type, the second data routing path comprising at least one different intermediate node from intermediate nodes of the first data routing path;
route a first subset of the data to the destination node over the determined first data routing path, wherein the first subset of the data comprises the first data traffic type;
route a second subset of the data to the destination node over the second data routing path, wherein the second subset of the data comprises the second data traffic type,
wherein the first predetermined routing criterion comprises a first Class of Service (CoS) criterion for the first data traffic type to be routed,
wherein the second predetermined routing criterion comprises a second CoS criterion for the second data traffic type to be routed.

12. The network node of claim 11, the operations further comprising to:
acquire measurements of the dynamically changing metric values.

13. The network node of claim 11, the operations further comprising to:
    acquire estimates of the dynamically changing metric values.

14. The network node of claim 11, the operations further comprising to:
    acquire new dynamically changing metric values after a predetermined time period has expired from the acquiring of the dynamically changing metric values.

15. A computer program product comprising a non-transitory computer readable storage medium storing computer-executable instructions for causing a device to perform the method recited in claim 1 when the computer-executable instructions are executed on a processor included in the device.

\* \* \* \* \*